Feb. 10, 1959  M. S. ERGENC  2,872,786
THERMAL POWER PLANT HAVING A VARIABLE-SPEED OUTPUT TURBINE
Filed Sept. 21, 1956
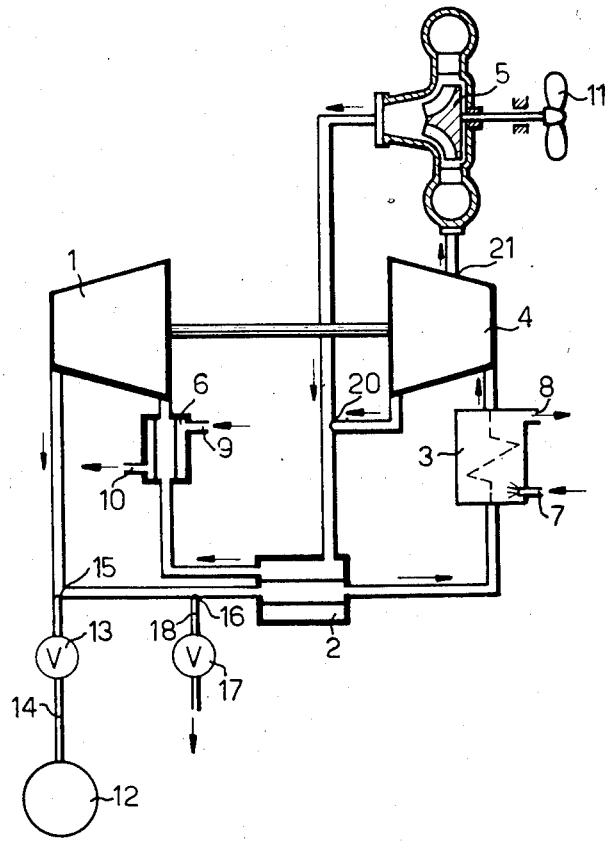
INVENTOR.
Mehmet Sahabettin Ergenç
BY
Attorneys

2,872,786

THERMAL POWER PLANT HAVING A VARIABLE-SPEED OUTPUT TURBINE

Mehmet Sahabettin Ergenç, Zurich, Switzerland, assignor to Aktiengesellschaft fuer Technische Studien, Zurich, Switzerland, a corporation of Switzerland Application September 21, 1956, Serial No. 611,296

Claims priority, application Switzerland October 12, 1955

2 Claims. (Cl. 60—59)

This invention relates to a thermal power plant in which a gaseous working medium is compressed by at least one compressor and, after being heated, is expanded in a turbine driving the compressor and in a variable-speed output turbine.

Such plants are preferably used for driving vehicles, particularly ships, and it is known to let the working medium flow through the compressor-driving turbine and output turbine in series. In order to reverse the motion from forwards to backwards it has been proposed to use a turbine in which the working medium flows radially inwardly.

These turbines have the characteristic that their intake capacity varies considerably with speed. With a constant head and a fixed position of the guide apparatus, the intake capacity decreases upon increase in speed.

This behavior is detrimental to the load distribution on the compressor-turbine and output turbine. At high speed, the lower intake capacity of the output turbine, when this is coupled at the rear of the other turbine, causes it to be subjected to a larger proportion of the total head, the compressor-turbine thus receiving a lower head and thereby suffering a decrease in output. This results in a decrease in the speed of that turbine and consequently also a decrease in the speed of the compressor driven thereby, the compressive power of which therefore also drops.

However, in ship drives or the like, a high output-turbine speed also demands a high output. The behavior referred to thus causes a break-down of the compression ratio just when the largest output is required and thus opposes the very requirements demanded of the plant. A correction could be effected by continually regulating an adjustable guide apparatus of the output turbine, but this requires complicated installations.

The invention aims to adapt the plant more closely to practical requirements without any special regulating apparatus. According to the invention, in a thermal power plant, in which a gaseous working medium is compressed by at least one compressor and, after being heated, is expanded in a turbine driving the compressor and in a variable-speed output turbine, this output turbine has at least one stage of the radially inward flow type and is traversed in parallel with at least one expansion stage of the compressor-driving turbine.

With this arrangement the output turbine and the stage or stages of the compressor-driving turbine in parallel therewith are always subjected to the same head. The decrease in intake capacity of the output turbine upon increase in speed thereby causes the parallel stages of the compressor-driving turbine to receive a large quantity of medium compared to the output turbine, and thus deliver a correspondingly higher output. The consequent increase in speed of the compressor group then results in an increase in the total compression ratio and meets the requirement of a higher output during high speed of the output turbine.

The thermal power plant according to the invention operates favourably even if the guide apparatus of the output turbine is stationary and without special means for changing the quantity of medium-flow through that turbine. At small loads and speeds the compression ratio is also small whilst high loads and speeds are associated with high compression ratios. The working range of the output turbine can thus be maintained at all speeds near its optimum value from the point of view of efficiency. The high compression ratio at high loads further enables the highest output to be delivered with comparatively small size machines.

The plant has a good efficiency and is simple and reliable.

The single figure in the drawing shows in diagram an exemplary embodiment of the invention.

In the thermal power plant illustrated the working medium circulates in series through a compressor 1, the high-pressure side of a heat exchanger 2, a heater 3, a turbine 4 for driving the compressor 1 associated, in a manner to be explained, with an output turbine 5, the working medium expanding in both these turbines, the low-pressure side of the heat exchanger 2, a cooler 6 and then back through the compressor 1 in which the expanded working medium is again compressed. Fuel is led to the heater through a line 7, the exhaust gases escaping through a line 8. The cooler 6 receives cooling water through a line 9 and the water flows out again through a line 10.

The output turbine 5 drives a ship's propeller 11. It is intended to be operated with a variable-speed and in the example illustrated has a single stage traversed radially inwardly by the working medium.

Numeral 12 designates a working medium storage container which communicates with a point 15 of the circuit via a line 14 having a valve 13. In addition, a point 16 is connected to a line 18 having a valve 17 and which, upon opening the valve 17, provides an outlet for working medium.

The drawing shows in diagram an arrangement which achieves excellent results by causing the working medium to flow through the output turbine 5 in parallel relation with only some of the expansion stages of the turbine 4 which drives the compressor. The part of the medium intended for the output turbine is withdrawn at a point 21 after having flowed through the first few expansion stages of the turbine 4. The portion of the medium withdrawn recombines with the rest of the medium at a point 20 after having passed through the turbine 5, the said rest of the medium having flowed through the stages of the turbine 4 following the point 21. Upon an increase in speed of the output turbine 5, the decrease in intake capacity of that turbine effects a shift of part of the power output to the parallel stages of the compressor-driving turbine 4 subjected to the same head. Thus there is obtained an increase in speed of the compressor 1 and consequently an increase in the compression ratio.

Because of the fact that the output turbine is connected in parallel with only some of the expansion stages of the turbine 4, there is the advantage that the output turbine, which preferably has only a single radially traversed stage, is subjected to a smaller pressure head than the turbine 4. It can be in parallel with any series of consecutive stages of the turbine 4. If the parallel portion of the expansion stages of the turbine 4 comprises the last stage, as in the illustrated example, then there is the added advantage that the input temperature at the output turbine is lower than that of the turbine driving the compressor. This simplifies the introduction of the necessary direction changing mechanisms at the inlet of the output turbine.

Instead of having only a single radial flow stage, the output turbine may also have two or more such stages.

Alternatively, a radial flow stage may be associated with axial flow stages before or after it.

What is claimed is:

1. In a thermal power plant comprising compressing means in which a gaseous working medium is brought to an elevated pressure, heating means in which the so-compressed working medium is heated, a stage turbine in driving connection with said compressing means, and flow connections leading said working medium serially through said compressing means, then through said heating means and then through at least the first stage of said turbine in which the working medium is caused to expand while doing work; a variable speed output turbine having at least one stage of the radially inward flow type; and a flow connection branching off from a point of the said turbine driving the compressing means situated between the first and the last stage thereof and leading a part of the working medium to said variable speed output turbine in which said part is caused to expand further while doing work, the remaining part of the working medium being caused to expand in at least one stage beyond said branching off point of said turbine driving the compressing means.

2. In a closed-cycle thermal power plant comprising compressing means in which a gaseous working medium is brought from an initial pressure to an elevated pressure, heating means in which the so-compressed working medium is heated, a turbine in driving connection with said compressing means, and flow connections leading said compressed working medium from the compressing means to said heating means and then from said heating means to said turbine in which the working medium is caused to expand in stages while doing work; a variable speed output turbine having at least one stage of the radially inward flow type; a flow connection branching off from a point situated between the first and the last stage of said turbine driving the compressing means and leading a part of the working medium to said variable speed output turbine in which said part is caused to expand to substantially said initial pressure, the remaining part of the working medium being caused to expand to substantially said initial pressure in at least said last stage of the turbine driving the compressing means; and a flow connection, including cooling means, for collecting the so-expanded working medium from said turbine driving the compressing means and said variable speed output turbine and reintroducing it into said compressing means.

References Cited in the file of this patent

UNITED STATES PATENTS

| 2,453,928 | Oechslin | Nov. 16, 1948 |

FOREIGN PATENTS

| 388,546 | France | June 8, 1908 |
| 639,211 | Great Britain | May 20, 1947 |